United States Patent
Umetsu

(10) Patent No.: US 8,248,642 B2
(45) Date of Patent: Aug. 21, 2012

(54) IMAGE PROCESSING APPARATUS, METHOD, AND COMPUTER-READABLE RECORDING MEDIUM FOR RECORDING A LOG OF A JOB

(75) Inventor: Fumihiro Umetsu, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 896 days.

(21) Appl. No.: 12/318,562

(22) Filed: Dec. 31, 2008

(65) Prior Publication Data

US 2009/0195838 A1  Aug. 6, 2009

(30) Foreign Application Priority Data

Jan. 31, 2008  (JP) ................................. 2008-020812

(51) Int. Cl.
G06F 3/12 (2006.01)
G06K 15/00 (2006.01)

(52) U.S. Cl. ..................... 358/1.15; 358/1.14

(58) Field of Classification Search ............... 358/1.1, 358/1.9, 1.13, 1.14, 1.15, 1.18, 296; 710/19, 710/263, 264, 266; 700/21, 100; 709/201, 709/213
See application file for complete search history.

(56) References Cited

U.S. PATENT DOCUMENTS

| | | | | |
|---|---|---|---|---|
| 5,729,736 A | * | 3/1998 | Gomi et al. | 707/783 |
| 6,313,921 B1 | * | 11/2001 | Kadowaki | 358/1.15 |
| 7,546,365 B2 | * | 6/2009 | Torii | 709/224 |
| 2006/0085697 A1 | | 4/2006 | Takeuchi et al. | 714/50 |
| 2007/0195364 A1 | * | 8/2007 | Umehara et al. | 358/1.15 |
| 2008/0065733 A1 | | 3/2008 | Umetsu | |
| 2008/0307255 A1 | * | 12/2008 | Chen et al. | 714/13 |

FOREIGN PATENT DOCUMENTS

| | | |
|---|---|---|
| JP | 2002-149382 | 5/2002 |
| JP | 2006-060642 | 3/2006 |
| JP | 2006-107217 | 4/2006 |

OTHER PUBLICATIONS

Office Action dated Jan. 4, 2012 issued in corresponding Japanese Application No. 2008-020812.

* cited by examiner

*Primary Examiner* — Gabriel Garcia

(74) *Attorney, Agent, or Firm* — Harness, Dickey & Pierce, P.L.C.

(57) ABSTRACT

A log recording module records a log of a job executed in an image processing apparatus in a hard disk drive (HDD). A facsimile control module receives a request to execute facsimile transmission, records the log that identifies the job in a nonvolatile random access memory (NVRAM), and executes the facsimile transmission. The facsimile control module distinguishes the log of a continuing job from the log of the job that was terminated by the power-off using the logs in the HDD and the NVRAM, and performs a process to transfer the log of a terminated job to a log server and a process to control recording the log of the continuing job.

13 Claims, 9 Drawing Sheets

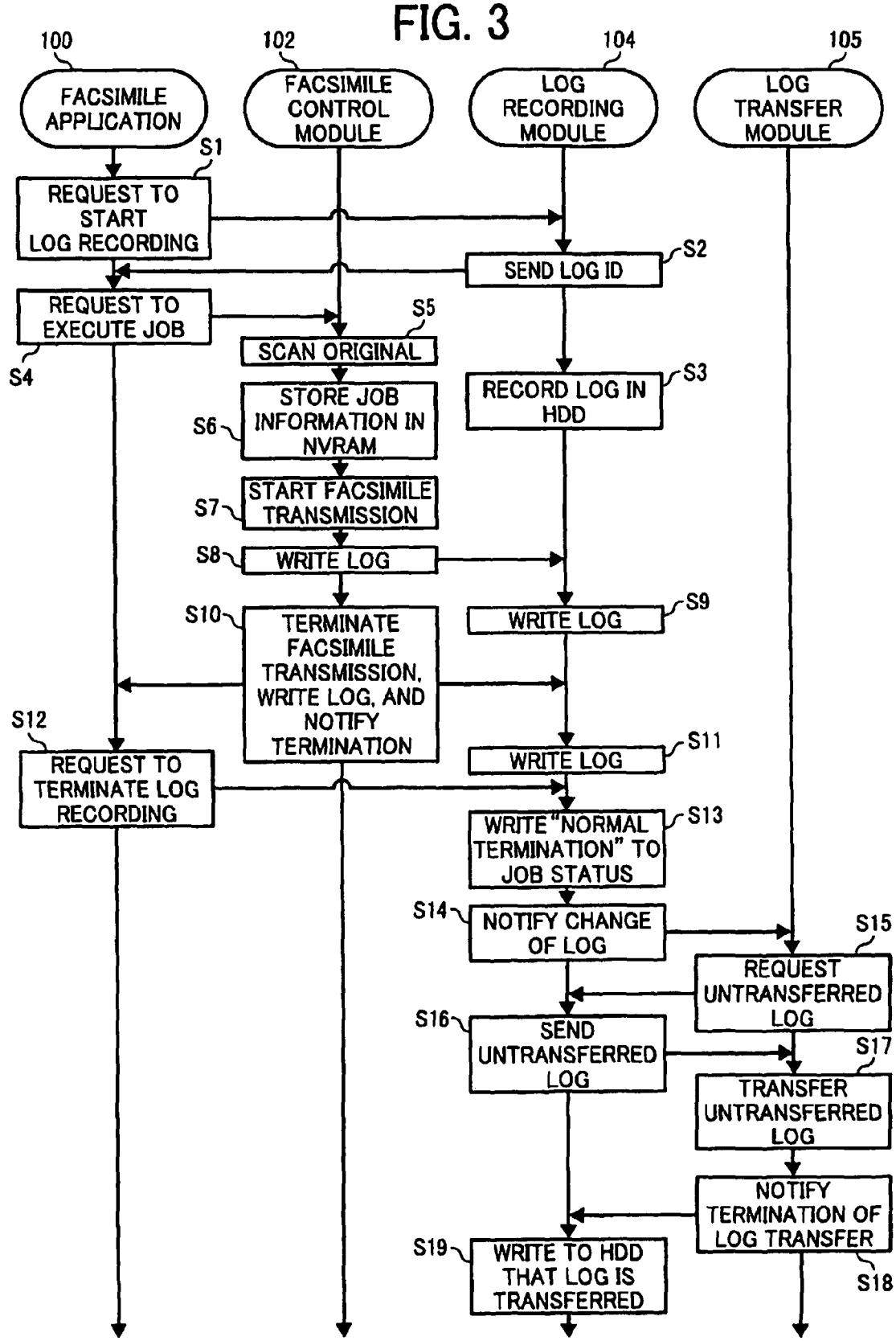

FIG. 4

| LOG ID | DATE AND TIME OF STARTING JOB | DATE AND TIME OF TERMINATING JOB | USER ID | JOB STATUS | LOG TYPE | OUTPUT SHEETS | TO BE TRANSFERRED/ TRANSFERRED |
|---|---|---|---|---|---|---|---|
| 1002 | 07.8.16 12:20 | | sato | UNDER EXECUTION | FACSIMILE TRANSMISSION | 2 | TO BE TRANSFERRED |
| 1003 | 07.8.16 12:30 | | suzuki | UNDER EXECUTION | FACSIMILE TRANSMISSION | 5 | TO BE TRANSFERRED |

FIG. 5

| LOG ID | DATE AND TIME OF STARTING JOB | USER ID | SHEETS TRANSMITTED | SPECIFIED DATE AND TIME OF TRANSMISSION | FACSIMILE NUMBER | FILE NAME |
|---|---|---|---|---|---|---|
| 1004 | 07.8.16 12:20 | sato | 0 | | FAX: 03-22-1234 | /hdd/ file 1 |
| 1005 | 07.8.16 12:30 | suzuki | 0 | 07.8.16 13:30 | FAX: 02-211-1345 | /hdd/ file 2 |

FIG. 6

| LOG ID | DATE AND TIME OF STARTING JOB | DATE AND TIME OF TERMINATING JOB | USER ID | JOB STATUS | LOG TYPE | OUTPUT SHEETS | TO BE TRANSFERRED/ TRANSFERRED |
|---|---|---|---|---|---|---|---|
| 1002 | 07.8.16 12:20 | 07.8.16 12:21 | sato | NORMAL TERMINATION | FACSIMILE TRANSMISSION | 2 | TRANSFERRED |
| 1003 | 07.8.16 12:30 | | suzuki | UNDER EXECUTION | FACSIMILE TRANSMISSION | 5 | TO BE TRANSFERRED |

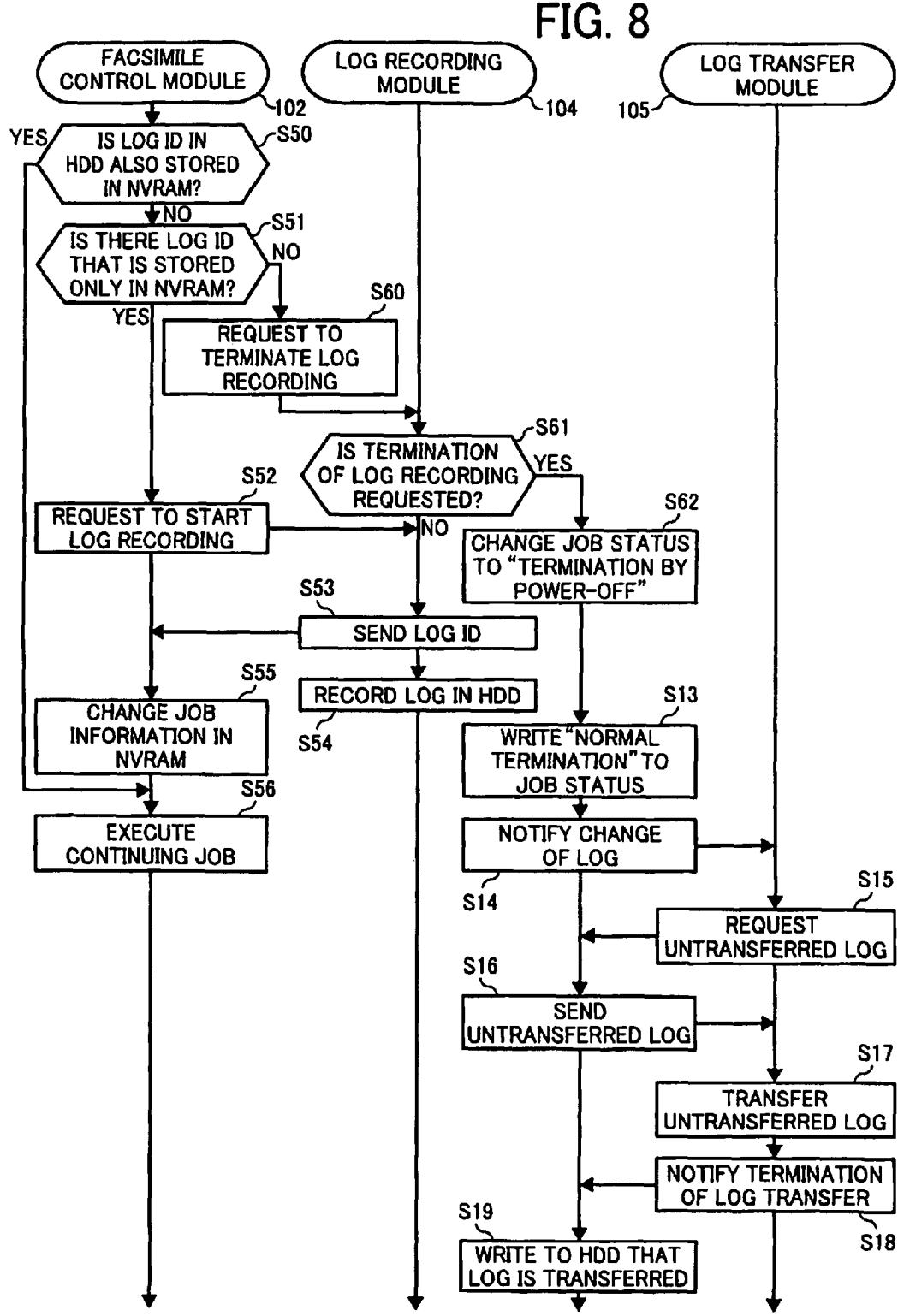

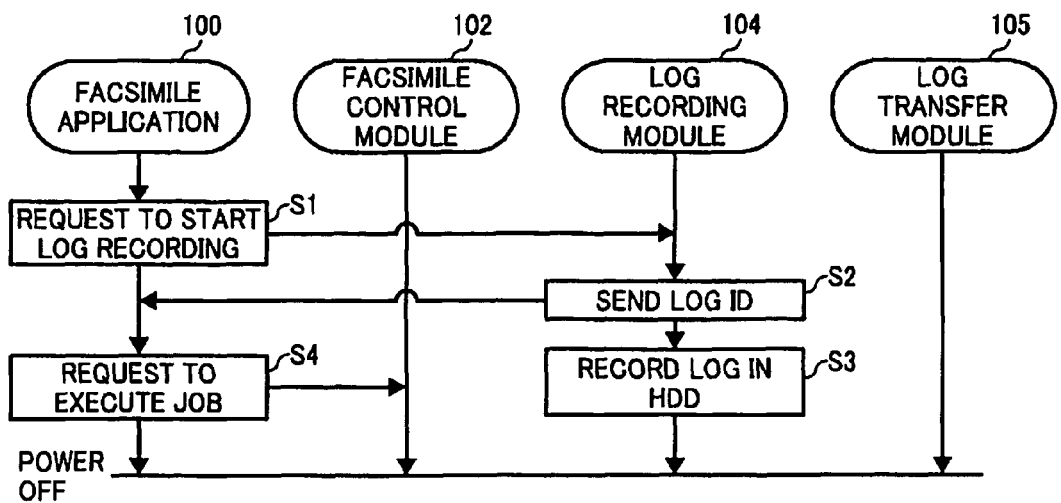
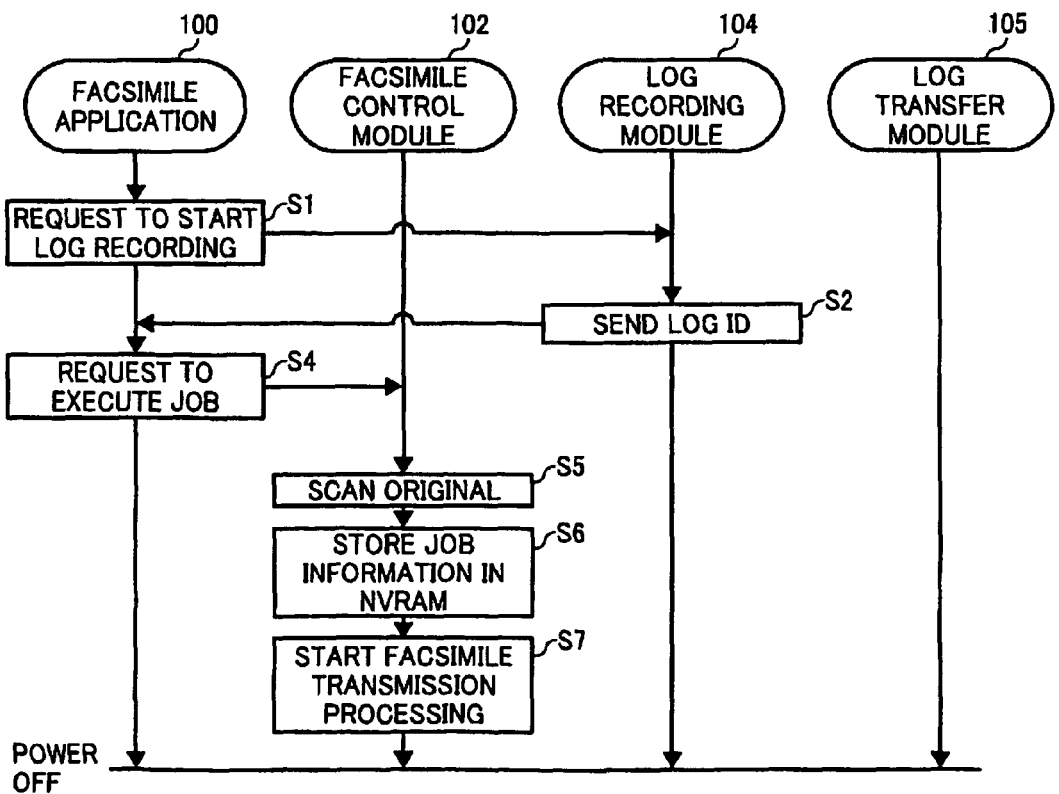

FIG. 12

| LOG ID | DATE AND TIME OF STARTING JOB | DATE AND TIME OF TERMINATING JOB | USER ID | JOB STATUS | LOG TYPE | OUTPUT SHEETS | TO BE TRANSFERRED/ TRANSFERRED |
|---|---|---|---|---|---|---|---|
| 1002 | 07.8.16 12:20 | 07.8.16 12:21 | sato | NORMAL TERMINATION | FACSIMILE TRANSMISSION | 2 | TRANSFERRED |
| 1003 | 07.8.16 12:30 | 07.8.16 12:31 | suzuki | TERMINATION BY POWER OFF | FACSIMILE TRANSMISSION | 5 | TRANSFERRED |

IMAGE PROCESSING APPARATUS, METHOD, AND COMPUTER-READABLE RECORDING MEDIUM FOR RECORDING A LOG OF A JOB

CROSS-REFERENCE TO RELATED APPLICATIONS

The present application claims priority to and incorporates by reference the entire contents of Japanese priority document 2008-020812 filed in Japan on Jan. 31, 2008.

BACKGROUND OF THE INVENTION

1. Field of the Invention

The present invention relates to a technology for recording a log of a job executed in an image processing apparatus.

2. Description of the Related Art

Various events occur in an image processing apparatus. Generally, a log of events occurring in an image processing apparatus is recorded in the image processing apparatus. There is known a system in which an entry is written in a log at a timing of occurrence of an event in an image processing apparatus and an administrator of the image processing apparatus refers to the log later. The log can be transferred from the image processing apparatus to a log server, the administrator can access the log server by using a client computer and see the log.

A job log is an example of such a log. The job log is a log of various jobs executed in the image processing apparatus. The job log is often used to sort charges and for a security purpose. The job log basically includes an entry for each job executed in the image processing apparatus and a status of the job.

For example, when a certain job starts, "under execution" is recorded in the job log as the current status of the job, and when the job is terminated, "terminated" is recorded as the current status in the job log. After "terminated" is recorded as the current status in the job log, the job log is transferred to the log server. However, if the power of the image processing apparatus is turned off while the status is recorded as "under execution", the job log is not transferred to the log server, i.e., the job log remains in the image processing apparatus. To prevent job logs from keep on accumulating in the image processing apparatus, as disclosed in, for example, Japanese Patent Application Laid-open No. 2006-60642, "terminated" is recorded as the current status in the job log after the power of the image processing apparatus is turned on and the job log is transferred to the log server.

A concrete example of a job executed in the image processing apparatus is facsimile transmission. Facsimile transmission includes a time-specified transmission mode in which a facsimile is transmitted at a specified time. In the time-specified transmission mode, depending on the timing of turning the power off, there is a risk of a disagreement between an actual status of the job and the status recorded in the job log. For example, if the power is turned off after the image processing apparatus receives a command to execute the time-specified transmission and before the specified time, the job log remains in the image processing apparatus with the status being "under execution". If the image processing apparatus is then turned on again before the specified time, the job still needs to be executed at the specified time because the actual status is still "under execution".

With the technology disclosed in Japanese Patent Application Laid-open No. 2006-60642, the status of this job in the job log also shifts to "terminated" and the job log is transmitted to the log server. In other words, with the conventional technology, it may happen that the job log of the job that remains under execution even after the power is turned off is transferred to the log server, incorrectly assuming that the job is terminated.

SUMMARY OF THE INVENTION

It is an object of the present invention to at least partially solve the problems in the conventional technology.

According to an aspect of the present invention, there is provided an image processing apparatus including a receiving unit that receives a request to execute a job related to image processing; an executing unit that executes a job for which a request is received by the receiving unit; a recording unit that records in a first storing unit a log indicative of a status and a content of each of the jobs executed by the executing unit, wherein the status is recorded as under execution when the receiving unit receives the request to execute the job, and the status is recorded as termination when the executing unit has successfully finished execution of the job; a transfer unit that transfers a first log among the logs recorded in the first storing unit to a log server, the first log being a log in which the status is recorded as termination; and a status changing unit that changes the status of a third log form among the second logs recorded in the first storing unit to termination when a power of the image processing apparatus is once turned off and then turned on again, the second log being a log whose status is under execution, the third log being a log whose status is under execution before a time point at which the power of the image processing apparatus was turned off and whose content indicates that the job will be executed after a time point at which the power is turned on.

According to another aspect of the present invention, there is provided an image processing method realized on an image processing apparatus. The image processing method including receiving a request to execute a job related to image processing; executing a job for which a request is at the receiving; recording in a first storing unit a log indicative of a status and a content of each of the jobs executed at the executing, wherein the status is recorded as under execution when receiving the request to execute the job at the executing, and the status is recorded as termination when execution of the job has successfully finished at the executing; transferring a first log among the logs recorded in the first storing unit to a log server, the first log being a log in which the status is recorded as termination; and changing the status of a third log form among the second logs recorded in the first storing unit to termination when a power of the image processing apparatus is once turned off and then turned on again, the second log being a log whose status is under execution, the third log being a log whose status is under execution before a time point at which the power of the image processing apparatus was turned off and whose content indicates that the job will be executed after a time point at which the power is turned on.

According to still another aspect of the present invention, there is provided a computer-readable recording medium that stores therein a computer program containing a computer program codes which when executed on a computer causes the computer to execute the above image processing method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart of a processing of recording a job log performed by the complex machine;

FIG. 4 is an example of a job log recorded in a hard disk drive (HDD) shown in FIG. 1;

FIG. 5 is an example of a job log recorded in a nonvolatile random access memory (NVRAM) shown in FIG. 1;

FIG. 6 is another example of a job log recorded in the HDD;

FIG. 8 is a flowchart of a determining processing performed at Step S35 in FIG. 7 and a processing performed by the complex machine depending on a determination made at Step S35;

FIG. 9 is a schematic diagram for explaining a timing of a power-off when a job log is recorded only in the HDD;

FIG. 10 is a schematic diagram for explaining a timing of the power-off when there is a job log that is recorded only in the NVRAM;

FIG. 12 is still another example of a job log recorded in the HDD.

DETAILED DESCRIPTION OF THE PREFERRED EMBODIMENTS

Exemplary embodiments of the present invention are described in detail below with reference to the accompanying drawings. The present invention is not limited to the embodiments, and various modifications can be made without departing from the scope of the invention.

Figure 1:
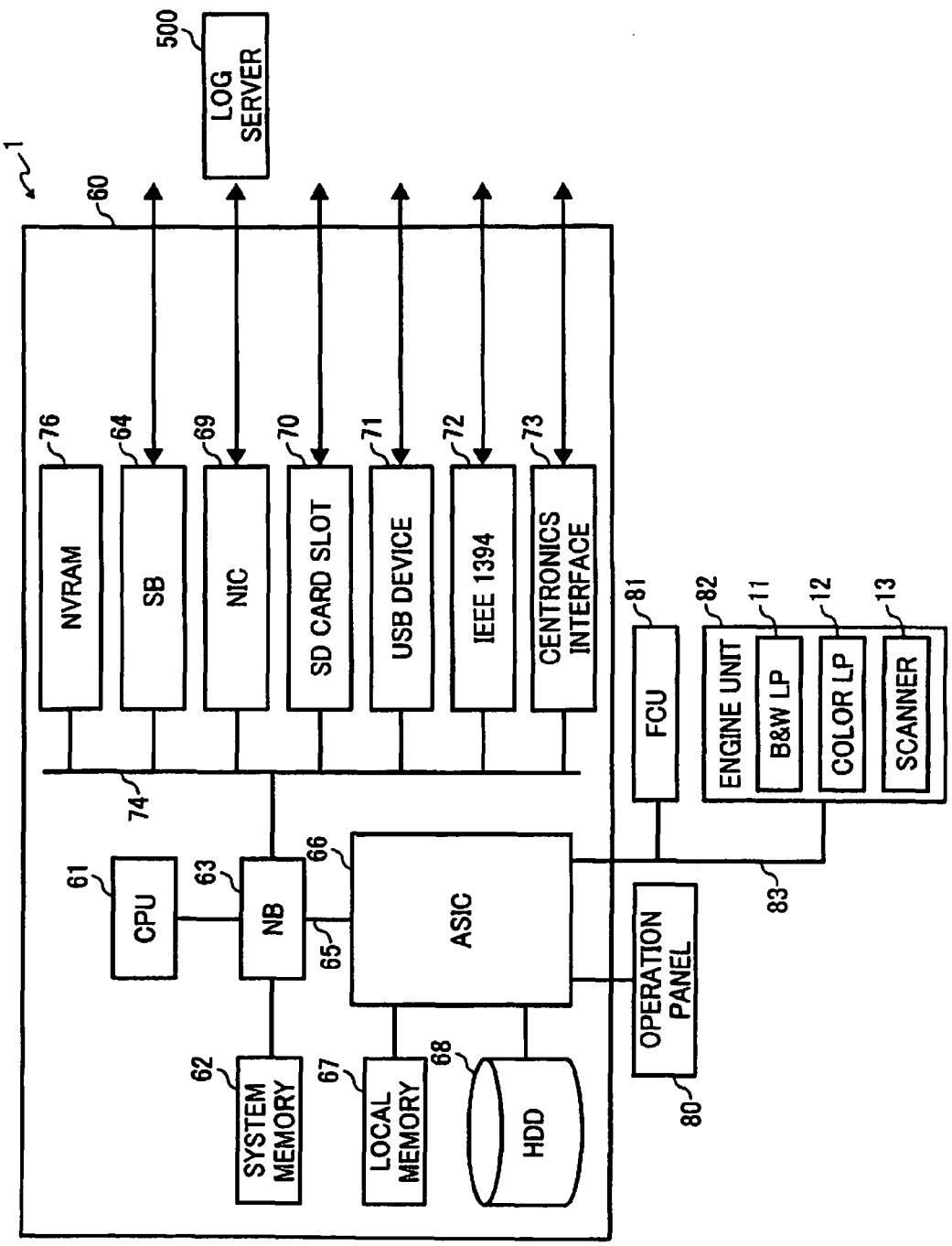
FIG. 1 is a block diagram of hardware in a complex machine according to a first embodiment of the present invention.

FIG. 1 is a block diagram of hardware in a complex machine 1 according to a first embodiment of the present invention. The complex machine 1 includes a controller 60, an operation panel 80, a facsimile control unit (FCU) 81, and an engine unit 82. The controller 60 includes a central processing unit (CPU) 61, a system memory 62, a north bridge (NB) 63, a south bridge (SB) 64, an application specific integrated circuit (ASIC) 66, a local memory 67, a hard disk drive (HDD) 68, a network interface card (NIC) 69, a secure digital (SD) card slot 70, a universal serial bus (USB) device 71, an Institute of Electrical and Electronics Engineers (IEEE) 1394 device 72, a Centronics interface 73, and a nonvolatile random access memory (NVRAM) 76.

The operation panel 80 is connected to the ASIC 66. The FCU 81 and the engine unit 82 are connected to the ASIC 66 with a peripheral component interconnect (PCI) bus 83.

In the controller 60, the ASIC 66 is connected to the local memory 67, the HDD 68, and the like, and the CPU 61 is connected to the ASIC 66 via the NB 63 of a CPU chipset. By connecting the CPU 61 to the ASIC 66 via the NB 63, the controller 60 can control the CPU 61 even when the interface of the CPU 61 is not published. The ASIC 66 and the NB 63 are connected via an accelerated graphics port (AGP) 65. By connecting the ASIC 66 and the NB 63 via the AGP 65 instead of a slow PCI bus, the controller 60 keeps a high performance.

The NB 63 connects the CPU 61, the system memory 62, the SB 64, the ASIC 66, the NIC 69, the SD card slot 70, the USB device 71, the IEEE 1394 device 72, and the Centronics interface 73 with one another.

The SB 64, the NIC 69, the SD card slot 70, the USB device 71, the IEEE 1394 device 72, and the Centronics interface 73 are connected to the NB 63 via a PCI bus 74. The SB 64 connects the PCI bus 74 to a read only memory (ROM) and peripheral devices.

The CPU 61 reads various types of software stored in the ROM and the HDD 68 connected via the SB 64, activates the software, controls the entire complex machine, and realizes various functions.

The system memory 62 is used for drawing in the complex machine 1. The local memory 67 is used as an image buffer for copying and a code buffer.

The ASIC 66 is an integrated circuit specific for an image processing application, which is used as hardware for image processing. The HDD 68 is a secondary storage unit that stores therein image data, document data, software, font data, form data, and the like.

The NIC 69 is an interface that connects the complex machine 1 to a network. The complex machine 1 is connected to a log server 500 that stores therein job logs via the NIC 69. The SD card slot 70 receives an SD card inserted to it, and performs an interruption to an SD card access driver, which will be described later, corresponding to an insertion or a removal of the SD card. The USB device 71, the IEEE 1394 device 72, and the Centronics interface 73 are interfaces compliant with respective standards. The NVRAM 76 stores therein various types of software and various data used to execute the software.

The operation panel 80 receives an input from an operator, and displays information for the operator. The engine unit 82 includes a black-and-white laser printer (B&W LP) 11, a color laser printer (color LP) 12, and a scanner 13 to process an image. The FCU 81 controls facsimile communication, and includes a memory (not shown). The memory is used to temporarily store therein facsimile data received when the power of the complex machine 1 is turned off, facsimile data to be sent based on the time-specified transmission, and the like.

Figure 2:
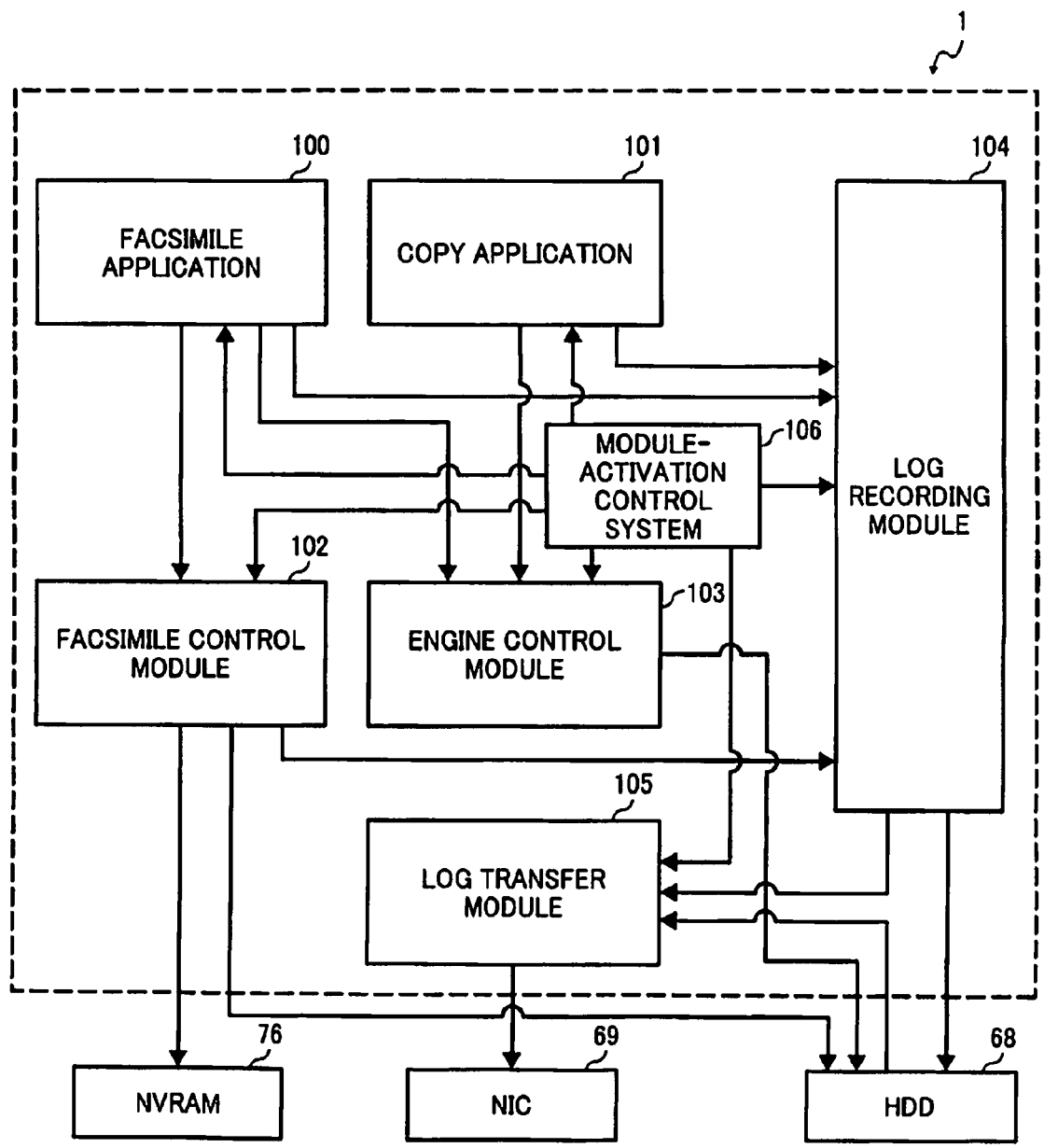
FIG. 2 is a block diagram of software in the complex machine shown in FIG. 1.

FIG. 2 is a block diagram of software in the complex machine 1. The software configuration is surrounded by a dotted line in FIG. 2. The complex machine 1 includes a facsimile application 100, a copy application 101, a facsimile control module 102, an engine control module 103, a log recording module 104, a log transfer module 105, and a module-activation control system 106. The module-activation control system 106 controls activation of the facsimile application 100, the copy application 101, the facsimile control module 102, the engine control module 103, the log recording module 104, and the log transfer module 105, when the power of the complex machine 1 is turned on.

The facsimile application 100 is used for facsimile transmission. The facsimile application 100 receives a request for execution of the facsimile transmission from a user through the operation panel 80, and requests the facsimile control module 102 to execute the facsimile transmission. The copy application 101 is used for copying. The copy application 101 receives a request for execution of the copying from a user through the operation panel 80, and requests the engine control module 103 to execute the copying. The copy application 101 also requests the log recording module 104 to record a log related to execution of the copying as a job, terminate the recording, and transfer the recorded log to the log server 500.

The log recording module 104 records the job log indicative of a status of jobs (hereinafter, "job status") related to the image processing, such as the copying and the facsimile transmission, and a content of the job in the HDD 68. Furthermore, when the power of the complex machine 1 is turned off and then on again, the log recording module 104 changes the job status of the job in the job log terminated by the power-off according to the actual state of the job. The log transfer module 105 transfers the job log recorded in the HDD 68 to the log server 500 via the NIC 69.

When the facsimile application 100 requests the facsimile control module 102 to execute the facsimile transmission, the facsimile control module 102 receives the request, records the job information indicative of the content of the job in the NVRAM 76, and controls the FCU 81 to execute the facsimile transmission. Furthermore, when the power of the complex machine 1 is turned on after it is turned off once, the facsimile control module 102 determines whether the job is terminated by the power-off based on the logs recorded in the HDD 68 and the job information recorded in the NVRAM 76. If the job is terminated, the facsimile control module 102 transfers it to the log server 500. If the job is still under execution, the facsimile control module 102 controls the record of the job in the job log. When the job is still under execution, it means that a request of execution of the job was received before the power-off, and the job is to be executed after the power is turned on again. When the copy application 101 requests the engine control module 103 to execute the copying, the engine control module 103 receives the request, records the job information indicative of the content of the job in the NVRAM 76, and controls the engine unit 82 to execute the copying.

A processing performed by the complex machine 1 is explained below. A basic processing of recording a job log performed by the complex machine 1 is explained referring to FIG. 3. Upon receipt of a request to start a job of facsimile transmission input by the user via the operation panel 80, the facsimile application 100 requests the log recording module 104 to start recording a log related to the facsimile transmission (Step S1). In the case of the time-specified transmission, the user inputs the date and time to transmit the facsimile and the facsimile number, which are included in the request to start the job. Upon receipt of the request to start the job, the log recording module 104 obtains a log identifier (ID), with which the log requested to start recording can be uniquely identified, and sends the log ID to the facsimile application 100 (Step S2). The log recording module 104 also generates the log for the log ID, and records the log in the HDD 68 (Step S3).

FIG. 4 is an example of the log recorded in the HDD 68. The log includes at least log ID, date and time of starting job, date and time of terminating job, job status, log type, and transfer flag. The date and time of starting job indicates the date and time at which the log recording module 104 is requested to start the recording. The date and time of terminating job indicates the date and time at which the log recording module 104 is requested to terminate the recording. In this case, the termination of the recording is not yet requested, and therefore the date and time is not written. The job status indicates the status of executing the job. In this case, the job status is "under execution". The log type indicates the type of the job, such as the copying and the facsimile transmission. In this case, the log type is "facsimile transmission". The transfer flag indicates whether the log has been transferred to the log server 500. In this case, the transfer flag indicates that the log has not yet been transferred.

Returning to FIG. 3, upon receipt of the log ID, the facsimile application 100 requests the facsimile control module 102 to execute the facsimile transmission as the job, and sends the log ID to the facsimile control module 102 (Step S4). The facsimile control module 102 receives the request, generates the image data by scanning the original to be transmitted and performing a predetermined image processing (Step S5), and stores the image in the HDD 68. Furthermore, upon receipt of the log ID, the facsimile control module 102 generates the job information that includes the log ID and the content of the job, and records the job information in the NVRAM 76 (Step S6).

FIG. 5 is an example of the log recorded in the NVRAM 76. The log includes at least log ID, date and time of starting job, date and time of transmission, specified date and time of transmission, facsimile number, and file name of the generated image data. If the job is to be transmitted in the time-specified transmission mode, the date and time scheduled to transmit the facsimile is written to the specified date and time of transmission.

The facsimile control module 102 starts execution of the job, thereby performing the facsimile transmission (Step S7), sends the content of the execution and the log ID to the log recording module 104, and terminates the write to the log (Step S8). After the facsimile transmission, the facsimile control module 102 deletes the image data stored in the HDD 68 for the facsimile transmission and the job information stored in the NVRAM 76. On the other hand, upon receipt of the request including the log ID and the content of the job, the log recording module 104 writes the content to the log (Step S9). Furthermore, upon termination of the job, the facsimile control module 102 notifies the facsimile application 100 of the termination, and requests the log recording module 104 to write the date and time of terminating job (Step S10). Upon receipt of the request, the log recording module 104 writes the date and time of terminating job of the log recorded in the HDD 68 (Step S11).

After the notification, the facsimile application 100 requests the log recording module 104 to terminate the recording to the log, and sends the log ID of the log related to the job to the log recording module 104 (Step S12). Upon receipt of the request and the log ID, the log recording module 104 changes the job status of the log identified by the log ID in the HDD 68 to indicate "normal termination" (Step S13). The log recording module 104 then notifies the log transfer module 105 of the fact that the job status of the log was changed (Step S14). Upon notification, the log transfer module 105 requests the log recording module 104 to send a log that has not been transferred to the log server 500, which is called an untransferred log (Step S15). Upon receipt of the request, the log recording module 104 sends an untransferred log in which the job status is terminated and that has not yet sent to the log transfer module 105 among the logs recorded in the HDD 68 (Step S16). The log transfer module 105 then transmits the untransferred log to the log server 500 (Step S17). When the transmission of the untransferred log is terminated, the log transfer module 105 notifies the log recording module 104 of the termination (Step S18). Upon receipt of the notification, the log recording module 104 changes the transfer flag of the log received as the untransferred log to "transferred" (Step S19).

FIG. 6 is another example of the log recorded in the HDD 68. Compared with the example shown in FIG. 4, the log with the log ID 1002 is changed to indicate the job status being "normal termination", the date and time of terminating job, and the transfer flag being "transferred".

Given below is an explanation of a case where the power of the complex machine 1 is turned off during the process as described above and the power is turned on again. When the power of the complex machine 1 is turned on, the module-activation control system 106 activates the facsimile application 100, the copy application 101, the facsimile control module 102, the engine control module 103, the log recording module 104, and the log transfer module 105. Each of the facsimile application 100, the copy application 101, the facsimile control module 102, the engine control module 103, the log recording module 104, and the log transfer module 105 performs initialization after the activation.

Figure 7:
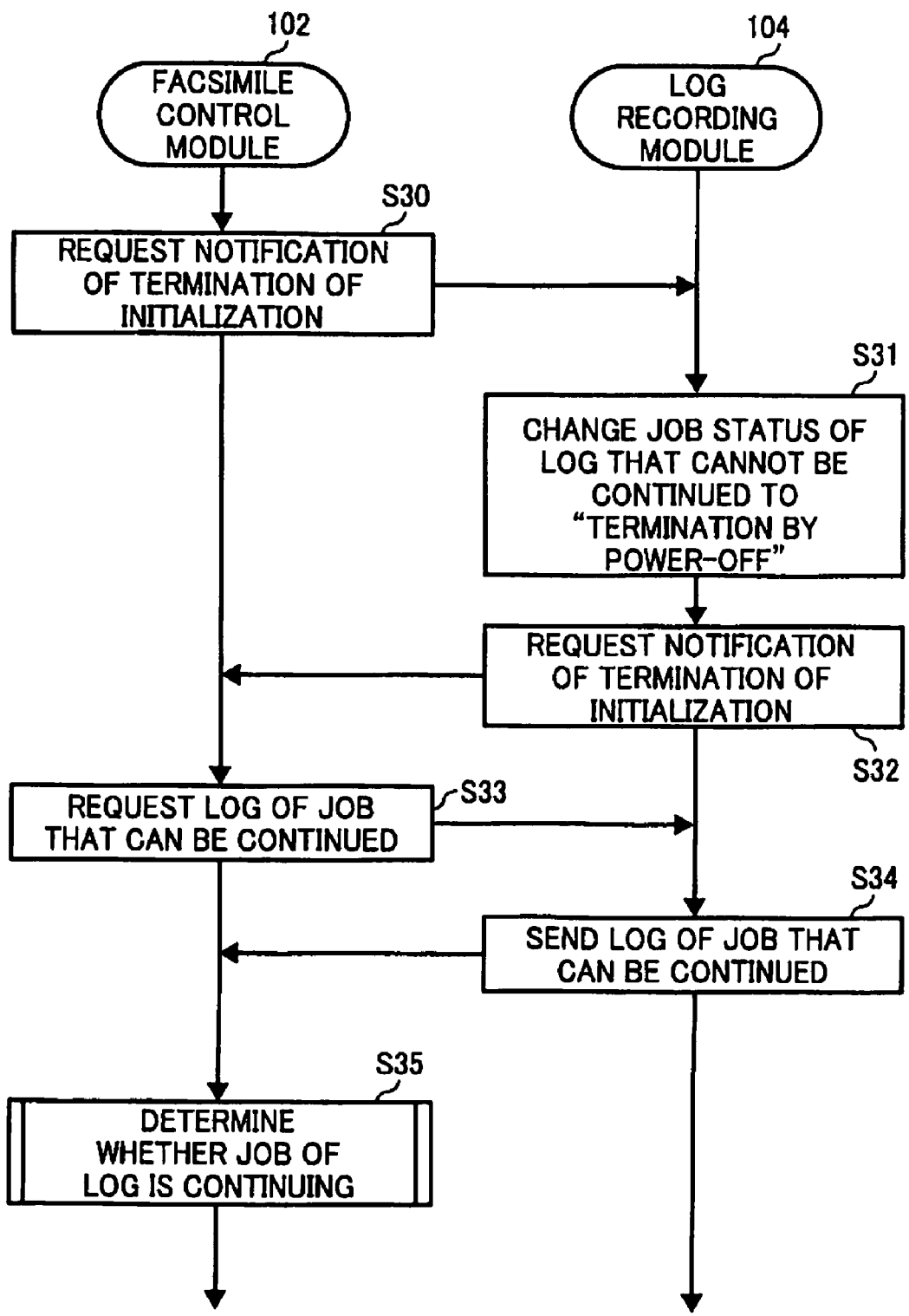
FIG. 7 is a flowchart of a part of initialization performed by a facsimile control module and a log recording module respectively shown in FIG. 2.

FIG. 7 is a flowchart of a part of the initialization performed by the facsimile control module 102 and the log recording module 104. When the facsimile control module 102 starts the initialization, the facsimile control module 102 requests the log recording module 104 to send a notification when the log recording module 104 terminates its initialization (Step S30). On the other hand, the log recording module 104 performs the initialization, and determines whether a log with the job status being "under execution" in the HDD 68 is a log of a job that can continue by referring to the log type. More specifically, the log recording module 104 determines that the log of which the log type is "facsimile transmission" should be the log of the job that can continue. If the log is not a log of the job that cannot continue, the log recording module 104 changes the job status of the log to "termination by power-off" (Step S31). For example, if the job status is "under execution" and the log type is "copy", the job status of the log is changed to "termination by power-off". If the job status if "under execution" and the log type is "facsimile transmission", the job status of the log remains "under execution". The job that can continue includes a continuing job and a job terminated by the power-off, which will be determined by the facsimile control module 102 later. Upon termination of the initialization, the log recording module 104 notifies the facsimile control module 102 (Step S32).

Upon receipt of the notification, the facsimile control module 102 requests the log of the job that can continue from the log recording module 104 (Step S33). The log of the job that can continue is the log of which the log type is "facsimile transmission" and the job status is "under execution". Upon receipt of the request, the log recording module 104 sends the corresponding log to the facsimile control module 102 (Step S34). Upon receipt of the log, the facsimile control module 102 determines whether the log is of the continuing job or of the job terminated by the power-off by referring to the job and the job information recorded in the NVRAM 76.

FIG. 8 is a flowchart of a determining processing performed at Step S35 and a processing performed by the complex machine 1 depending on the determination made at Step S35. The facsimile control module 102 determines whether the job information including the same log ID as the log received from the log recording module 104 is stored in the NVRAM 76 (Step S50). If such job information is not stored in the NVRAM 76, the facsimile control module 102 determines whether there is a log ID of which the job information is stored only in the NVRAM 76 (Step S51).

If the job information including the same log ID as the log received from the log recording module 104 is not stored in the NVRAM 76 (NO at Step S50 and NO at Step S51), i.e., if the log is stored only in the HDD 68, it means that the power was turned off between Step S4 and Step S5, as in FIG. 9. In this case, the facsimile control module 102 determines that the job was terminated by the power-off without being executed.

If there is a log ID of which the job information is stored only in the NVRAM 76 (YES at Step S51), it means that the HDD 68 does not store therein the log that should have been recorded in the HDD 68 at Step S3, as shown in FIG. 10. For example, the power was turned off while the log was waiting to be written to the HDD 68 because other information was written to the HDD 68. In this case, the job corresponding to the log ID was waiting to be executed, and therefore the facsimile control module 102 determines that the job is continuing.

Figure 11:
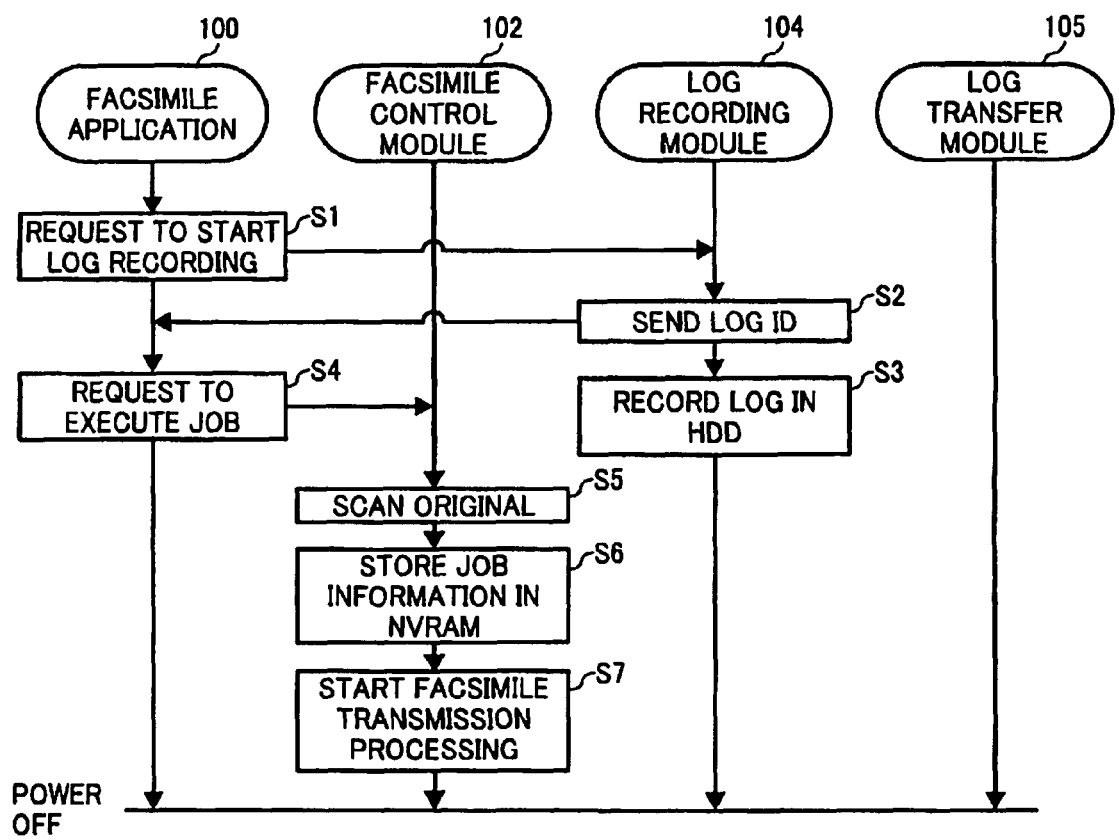
FIG. 11 is a schematic diagram for explaining a timing of the power-off when job logs with an identical log identifier (ID) are recorded in both the HDD and the NVRAM.

If the job information including the same log ID as the log received from the log recording module 104 is stored in the NVRAM 76 (YES at Step S50), it means that the power was turned off after Step S7 and before Step S12, as shown in FIG. 11. In this case, because the job can return to the status before the power-off and continue to be executed after the power is turned on again, the log does not need to be initialized.

In this manner, because the job status of the log varies depending on the timing of turning the power of the complex machine 1 off, it is possible to distinguish the log of the continuing job from the log of the job that was terminated by the power-off among the logs of the jobs that can continue.

Returning to FIG. 8, when the result of the determination is NO at both Step S50 and Step S51, the facsimile control module 102 determines that it is the log of the job that was terminated by the power-off. The facsimile control module 102 requests the log recording module 104 to terminate the log recording, and sends the log ID of the log to the log recording module 104 (Step S60). The log recording module 104 receives the request (YES at Step S61). Upon receipt of the log ID, the log recording module 104 changes the job status in the corresponding log stored in the HDD 68 to "termination by power-off" (Step S62). Steps S14 and later are same as described above. After Step S19, the facsimile control module 102 terminates its initialization.

FIG. 12 is still another example of the log recorded in the HDD 68. The log with the log ID 1003 is determined to be a log of the job terminated by the power-off. Compared with the example shown in FIG. 6, the log is changed to indicate the job status being "termination by power-off", the date and time of terminating job, and the transfer flag being "transferred".

When the result of the determination is NO at Step S50 and YES at Step S51, the facsimile control module 102 determines that it is the log of the continuing job, and requests the log recording module 104 to start recording the log (Step S52). The log recording module 104 obtains the log ID, with which the log requested to start recording can be uniquely identified, and sends the log ID to the facsimile application 100 (Step S53). The log recording module 104 also generates the log for the log ID, and records the log in the HDD 68 (Step S54). Upon receipt of the log ID, the facsimile control module 102 changes the log ID of the log determined to be stored only in the NVRAM 76 at Step S51 to the received log ID (Step S55), and terminates the initialization. The facsimile control module 102 then executes the job according to the content of the log in the NVRAM 76. For example, if the job is the time-specified transmission, the facsimile control module 102 controls the FCU 81 to perform the facsimile transmission using the corresponding facsimile data at the specified date and time in the log (Step S56).

when the result of the determination is YES at Step S50, the facsimile control module 102 performs the process at Step S56.

If there are more than one logs of the jobs that can continue after the power of the complex machine is turned off, the facsimile control module 102 makes determinations at Steps S50 and S51, and performs the corresponding processes.

In this manner, by checking the job status of the log that varies depending on the timing of turning the power of the complex machine 1 off, it is possible to determine whether the log is of job terminated by the power-off or of the continuing job. Furthermore, by changing the job status in the log of the job that was terminated by the power-off, it is possible to transfer the log to the log server without accumulating the untransferred logs. On the other hand, it is possible to appropriately record the log of the continuing job without transferring the log to the log server before termination of the job. Therefore, capacity of the HDD 68 that stores therein the job information can be effectively saved, and an administrator can refer to correct logs.

The present invention is not limited to the first embodiment, and it can be realized by modifying its configuration without departing from the scope of the invention. Various modifications can be formed by a combination of a plurality of constituents described in the first embodiment. For example, some of the constituents can be deleted from the entire configuration, or a plurality of constituents in different embodiments can be combined.

Various computer programs including software and modules executed by the complex machine 1 in the first embodiment can be stored in a computer connected to a network, such as the Internet, so that they can be provided by downloading them via the network. Alternatively, the computer programs can be stored in a computer readable recording medium, such as a compact disk read only memory (CD-ROM), a flexible disk (FD), a compact disk readable (CD-R), and a digital versatile disk (DVD), in an installable or executable format.

The image processing apparatus according to the present invention is not limited to be applied to a complex machine as in the first embodiment. That is, it can be applied to a copy machine, a printer, a facsimile machine, or the like.

Although the image processing apparatus handles the facsimile transmission as the job that can continue in the first embodiment, the image processing apparatus can also handle other jobs including copying and printing.

Although the image processing apparatus handles the time-specified transmission as the continuing job in the first embodiment, the continuing job can be a facsimile transmission waiting to be retried due to a busy line, or the like.

The recording unit in which the log recording module 104 records the log can be a recording unit other than the HDD 68. Furthermore, the recording unit in which the facsimile control module 102 records the log can be a recording unit other than the NVRAM 76.

Although the HDD 68 stores therein the image data for the facsimile transmission in the first embodiment, the complex machine 1 can be configured to include another HDD to store the image therein.

According to an aspect of the present invention, it is possible to prevent accumulation of the untransferred logs in the image processing apparatus, and prevent disagreement of the job status in the log of the continuing job after the power is turned off and then on again with the actual status of the job.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a receiving unit that receives a request to execute a job related to image processing;
an executing unit that executes a job for which a request is received by the receiving unit;
a recording unit that records in a first storing unit a log indicative of a status and a content of each job executed by the executing unit, wherein the status is recorded as under execution when the receiving unit receives the request to execute the job, and the status is recorded as termination when the executing unit has successfully finished execution of the job;
a transfer unit that transfers a first log among the logs recorded in the first storing unit to a log server, the first log being a log in which the status is recorded as termination; and
a status changing unit that changes the status of a third log from among second logs recorded in the first storing unit to termination when a power of the image processing apparatus is once turned off and then turned on again, each of the second logs being a log whose status is under execution, the third log being a log whose status is under execution before a time point at which the power of the image processing apparatus was turned off and whose content indicates that the job will be executed after a time point at which the power is turned on.

2. The image processing apparatus according to claim 1, wherein
the executing unit records job information indicative of a content of the job for which a request is received by the receiving unit in a second storing unit, and
the status changing unit includes:
a comparing unit that compares the second logs stored in the first storing unit with pieces of the job information stored in the second storing unit to check whether there is a mismatching second log among the second logs stored in the first storing unit, the mismatching second log being a log whose content do not match with the content of none of the pieces of the job information stored in the second storing unit; and
a changing unit that, if the comparing unit locates a mismatching second log, changes the status of the mismatching second log to termination so as to change the job-information mismatching second log to the third log.

3. The image processing apparatus according to claim 2, wherein
the comparing unit checks whether there is a mismatching job-information among the pieces of the job-information stored in the second storing unit, the mismatching job-information being a piece of job-information whose content do not match with the content of none of the second log stored in the first storing unit, and
the recording unit records a log corresponding to the mismatching job-information as a fourth log in the first storing unit, a status and a content of the fourth log being same as a content of the log corresponding to the mismatching job-information, the fourth log being a log of a job for which a request is received by the receiving unit before a time point at which the power of the image processing apparatus was turned off that will be executed after a time point at which the power is turned on.

4. The image processing apparatus according to claim 2, wherein
the recording unit allocates a unique log identifier to each of the log when recording the log in the first storing unit and informs the log identifier to the executing unit,
the executing unit inserts a log identifier received from the recording unit into a corresponding piece of the job information when recording the job information in the second storing unit, and
the comparing unit compares the log identifiers in the second logs and the job information.

5. The image processing apparatus according to claim 1, wherein the transfer unit transfers the third log to the log server.

6. The image processing apparatus according to claim 1, wherein
the recording unit records the status of the job as normal termination when execution of the job is successfully finished, and
the status changing unit changes the status of the third log to termination due to power-off.

7. An image processing method realized on an image processing apparatus, the image processing method comprising:
receiving a request to execute a job related to image processing;
executing a job for which a request is at the receiving;
recording in a first storing unit a log indicative of a status and a content of each job executed at the executing, wherein the status is recorded as under execution when receiving the request to execute the job at the executing, and the status is recorded as termination when execution of the job has successfully finished at the executing;
transferring a first log among the logs recorded in the first storing unit to a log server, the first log being a log in which the status is recorded as termination; and
changing the status of a third log from among second logs recorded in the first storing unit to termination when a power of the image processing apparatus is once turned off and then turned on again, each of the second logs being a log whose status is under execution, the third log being a log whose status is under execution before a time point at which the power of the image processing apparatus was turned off and whose content indicates that the job will be executed after a time point at which the power is turned on.

8. The image processing method according to claim 7, wherein
the executing includes recording job information indicative of a content of the job for which a request is received at the receiving in a second storing unit, and
the changing includes:
comparing the second logs stored in the first storing unit with pieces of the job information stored in the second storing unit to check whether there is a mismatching second log among the second logs stored in the first storing unit, the mismatching second log being a log whose content does not match with the content of any of the pieces of the job information stored in the second storing unit; and
changing, if the comparing locates a mismatching second log, the status of the mismatching second log to termination so as to change the job-information mismatching second log to the third log.

9. The image processing method according to claim 8, wherein
the comparing includes checking whether there is a mismatching job-information among the pieces of the job-information stored in the second storing unit, the mismatching job-information being a piece of job-information whose content do not match with the content of none of the second log stored in the first storing unit, and
the recording includes recording a log corresponding to the mismatching job-information as a fourth log in the first storing unit, a status and a content of the fourth log being same as a content of the log corresponding to the mismatching job-information, the fourth log being a log of a job for which a request is received at the receiving before a time point at which the power of the image processing apparatus was turned off that will be executed after a time point at which the power is turned on.

10. The image processing method according to claim 8, wherein
the recording includes allocating a unique log identifier to each of the log when recording the log in the first storing unit,
the executing includes receiving log identifiers and inserting a log identifier into a corresponding piece of the job information when recording the job information in the second storing unit, and
the comparing includes comparing the log identifiers in the second logs and the job information.

11. The image processing method according to claim 7, wherein the transferring includes transferring the third log to the log server.

12. The image processing method according to claim 7, wherein
the recording includes recording the status of the job as normal termination when execution of the job is successfully finished, and
the changing includes changing the status of the third log to termination due to power-off.

13. A non-transitory computer-readable recording medium that stores therein a computer program containing a computer program codes which when executed on a computer causes the computer to execute on an image processing apparatus:
receiving a request to execute a job related to image processing;
executing a job for which a request is at the receiving;
recording in a first storing unit a log indicative of a status and a content of each job executed at the executing, wherein the status is recorded as under execution when receiving the request to execute the job at the executing, and the status is recorded as termination when execution of the job has successfully finished at the executing;
transferring a first log among the logs recorded in the first storing unit to a log server, the first log being a log in which the status is recorded as termination; and
changing the status of a third log from among second logs recorded in the first storing unit to termination when a power of the image processing apparatus is once turned off and then turned on again, each of the second logs being a log whose status is under execution, the third log being a log whose status is under execution before a time point at which the power of the image processing apparatus was turned off and whose content indicates that the job will be executed after a time point at which the power is turned on.

* * * * *